March 18, 1952 G. D'A. BROWNE 2,589,334
CIRCUIT ARRANGEMENT FOR TIME SUBDIVISION
Filed June 19, 1948

INVENTOR.
GEORGE D'ARCY BROWNE
BY Fred M Vogel
AGENT

Patented Mar. 18, 1952 2,589,334

UNITED STATES PATENT OFFICE 2,589,334

CIRCUIT ARRANGEMENT FOR TIME SUBDIVISION

Geoffrey D'Arcy Browne, Upper Norwood, London, assignor to The Hartford National Bank and Trust Company, Hartford, Conn., as trustee Application June 19, 1948, Serial No. 34,090
In Great Britain June 18, 1947

4 Claims. (Cl. 250—36)

This invention relates to circuit arrangements for time sub-division.

It is sometimes required to sub-divide a period of time into a number of accurately determined time intervals, the period being marked for example, by electrical signals. If the number of time intervals in one period of time is suitable, as is often the case in practice, the sub-division may conveniently be carried out, in a manner well known in the art, with the use of successive stages of electrical frequency multiplication which finally synchronize a master oscillator, the periodic time of the master oscillation being equal to one time interval.

If it is required to operate an electronic distributor from such a master oscillator and from intermediate stages of such successive frequency multiplication stages, it is necessary that certain phase relationships be determined between the electrical signals produced at different frequency multiplication stages in order that the distributor may operate correctly and energise circuits associated with it in the desired sequence. This requirement may arise, for example, in connection with the reception of multiplex pulse telephony.

The object of the invention is to provide an improved circuit arrangement for the subdivision of time in which the frequency multiplication stages operate in phases determined with respect to the period of time and are timed by the master oscillator, the periodic time of oscillation of which master oscillator is equal to one time interval.

According to the invention a circuit-arrangement for sub-division of periods of time, comprises at least one frequency multiplier stage which is supplied with synchronizing impulses from two sources, the said frequency multiplier stage commutating at points in time determined with respect to one of the said sources of synchronizing impulses the frequency of which is higher than that of the said stage with a phase determined with respect to the other of the said sources of synchronizing impulses the frequency of which is lower than that of the said stage.

In one embodiment of the invention, the frequency multiplier stages of the circuit-arrangement are all frequency doubler stages, and each intermediate stage is synchronized from two sources, the first of which produces a synchronising impulse at a definite phase of each cycle of a doubler of lower frequency, and the second of which is constituted by the doubler stage of next highest frequency.

According to a further feature of the invention these two synchronising impulses, for each intermediate stage determine the instants at which commutation occurs and determine the phase in which the cycle occurs.

Figure 1:
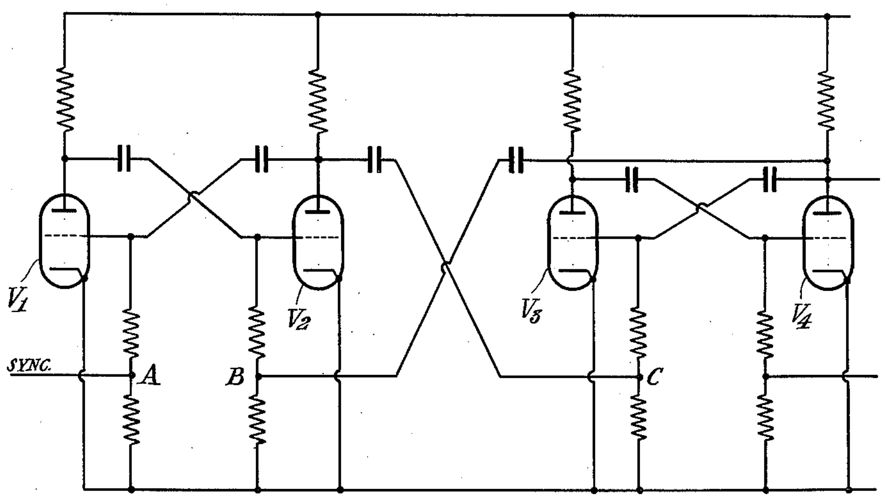
Figure 2:
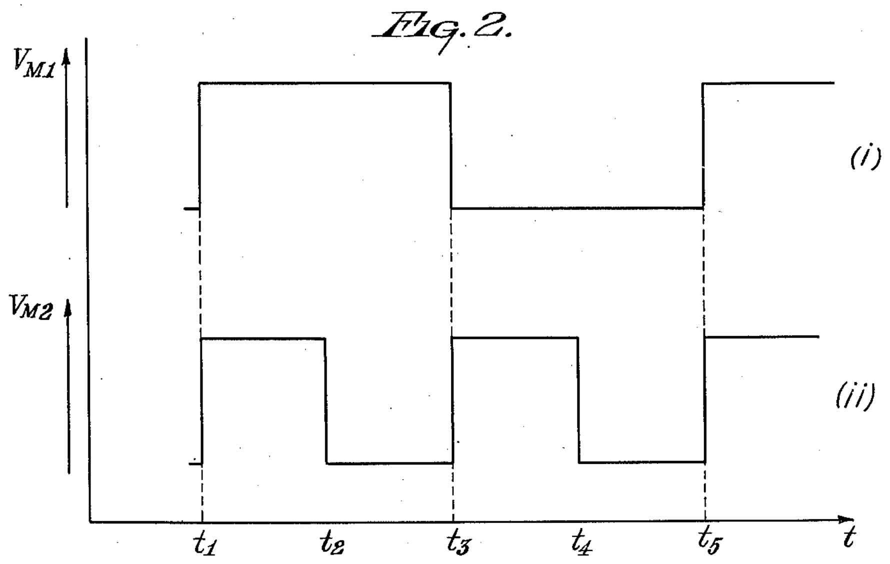

The nature of the invention will now be described more fully by reference to the accompanying drawing in which:

Figure 1 shows the first two frequency doubling stages in a circuit-arrangement according to the invention, and Figure 2 shows wave-forms illustrating the operation of the circuit-arrangement shown in Figure 1.

Referring to Figure 1, a first multivibrator comprises thermionic valves $V_1$ and $V_2$, so arranged that the multivibrator operates in a substantially symmetrical manner, the idealised anode voltage waveform $V_{m1}$ obtained being shown in Figure 2 (*i*). A second multivibrator comprising thermionic valves $V_3$ and $V_4$ is also shown in Figure 1 and is so arranged that this second multivibrator also operates in a substantially symmetrical manner with a frequency which is twice that of the first multivibrator, as is indicated by the relationship in time $t$ between the anode voltage wave forms $V_{m1}$ and $V_{m2}$ shown in Figures 2(*i*) and 2(*ii*).

The limit corresponding to $t_1t_5$ of each complete time interval determined by the anode voltage variations of the first multivibrator are synchronised, for example, by impulse injection at the point A in Figure 1. The voltage output at the anode of $V_2$ provides, for example, by way of a connection to the point C, impulses at times corresponding to $t_1t_5$ which for the second multivibrator which operates at twice the frequency of the first multivibrator, determine the phase and one commutation point of the second multivibrator, which in turn for example, by means of impulses derived from the anode of $V_4$ and applied to the point B determines the position in time of the half-period point of commutation corresponding to $t_3$, relative to the determined points in time $t_1t_5$, and so on. Thus the time intervals $t_1t_3$, $t_3t_5$ are completely determined. It is obvious that the provision of a third multivibrator enables the relative positions in time $t_1$, $t_2$, $t_3$ and so on and hence the time intervals, $t_1t_2$, $t_2t_3$, $t_3t_4$ to be determined completely and that multivibrators may also be provided thereafter to provide smaller subdivision of the time interval determined by the synchronising impulses injected into the first multivibrator.

It will be apparent that the natural period of each multivibrator must be not less than and preferably does not greatly exceed the interval between the synchronising signal controlling the period of the said multivibrator. Thus, in the example described with reference to Figs. 1 and 2, the natural period of the multivibrator $V_1V_2$ must not be less than and preferably is slightly in excess of the interval between the original synchronising pulses applied at A. Similarly for the natural period of the multivibrator and the interval between the pulses applied at C, and so on for all the stages.

I claim:

1. In a time sub-division system, the combination comprising first and second generators for producing periodic voltages having a rising portion and a trailing portion, and including first and second input circuits for controlling the time position of said rising and trailing portions respectively, the periodicity of said second generator being a multiple of said first generator, means to apply synchronizing pulses to the first input circuit of said first generator to initiate the rising portion of the periodic voltage produced therein, means to apply the periodic voltage developed by said first generator to the input circuit of said second generator to initiate the rising portion of the periodic voltage produced therein, and means to apply the periodic voltage developed by said second generator to the second input circuit of said first generator to control the time position of the trailing portion of the periodic voltage produced therein.

2. In a time sub-division system, the combination comprising a first multivibrator for generating periodic rectangular pulses and including commutating first and second discharge tubes each having a cathode, a grid and an anode, means to apply synchronizing pulses to the grid of said first tube to develop rectangular pulses at the anode of said second tube whose phase depends on said synchronizing pulses, a second multivibrator for generating periodic rectangular pulses and including commutating third and fourth discharge tubes each having a cathode, a grid and an anode, the periodicity of said second multivibrator being a multiple of said first multivibrator, means to apply the rectangular pulses developed at the anode of said second tube to the grid of said third tube whereby the phase of the rectangular pulses developed at the anode of the fourth tube depends thereon, and means to apply the rectangular pulses developed at the anode of said fourth tube to the grid of said second tube to control the commutation of said first multivibrator.

3. In a time sub-division system, the combination comprising a first symmetrical multivibrator for generating periodic rectangular pulses and including commutating first and second discharge tubes each having a cathode, a grid and an anode, means to apply synchronizing pulses to the grid of said first tube to develop rectangular pulses at the anode of said second tube whose phase depends on said synchronizing pulses, a second symmetrical multivibrator for generating periodic rectangular pulses and including commutating third and fourth discharge tubes each having a cathode, a grid and an anode, the periodicity of said second multivibrator being twice that of said first multivibrator, means to apply the rectangular pulses developed at the anode of said second tube to the grid of said third tube whereby the phase of the rectangular pulses developed at the anode of the fourth tube depends thereon, and means to apply the rectangular pulses developed at the anode of said fourth tube to the grid of said second tube to control the commutation of said first multivibrator.

4. In a time sub-division system, the combination comprising a first symmetrical multivibrator for generating periodic rectangular pulses and including commutating first and second discharge tubes each having a cathode, a grid and an anode and means cross coupling the grids and anodes of said first and second tubes, means to apply synchronizing pulses to the grid of said first tube to develop rectangular pulses at the anode of said second tube whose phase depends on said synchronizing pulses, a second symmetrical multivibrator for generating periodic rectangular pulses and including commutating third and fourth discharge tubes each having a cathode, a grid and an anode and means cross coupling the grids and anodes of said third and fourth tubes, the periodicity of said second multivibrator being double that of said first multivibrator, means to apply the rectangular pulses developed at the anode of said second tube as a synchronizing pulse to the grid of said third tube whereby the phase of the rectangular pulses developed at the anode of the fourth tube depends thereon, and means to apply the rectangular pulses developed at the anode of said fourth tube to the grid of said second tube to control the commutation of said first multivibrator.

GEOFFREY D'ARCY BROWNE.

REFERENCES CITED

The following references are of record in the file of this patent:

UNITED STATES PATENTS

| Number | Name | Date |
|---|---|---|
| 2,304,813 | Gibbs et al. | Dec. 15, 1942 |
| 2,390,608 | Miller et al. | Dec. 11, 1945 |